United States Patent
Windrem et al.

(10) Patent No.: US 6,526,225 B1
(45) Date of Patent: Feb. 25, 2003

(54) DISK-BASED DIGITAL VIDEO RECORDER

(75) Inventors: Kevin D. Windrem, Grass Valley, CA (US); David Casper, Oregon House, CA (US); Anna Greco, Grass Valley, CA (US); Scott Murray, Nevada City, CA (US); Paul O'Connor, Grass Valley, CA (US); Elaine B. Zamani, Nevada City, CA (US)

(73) Assignee: Grass Valley (US), Inc., Nevada City, CA (US)

( * ) Notice: Subject to any disclaimer, the term of this patent is extended or adjusted under 35 U.S.C. 154(b) by 0 days.

(21) Appl. No.: 09/489,258

(22) Filed: Jan. 21, 2000

Related U.S. Application Data

(63) Continuation of application No. 08/885,074, filed on Jun. 30, 1997, now Pat. No. 6,289,172, which is a continuation of application No. 07/949,174, filed on Sep. 21, 1992, now abandoned.

(51) Int. Cl.$^7$ .............................................. H04N 5/781
(52) U.S. Cl. ...................................... 386/125; 386/105
(58) Field of Search ............................... 386/46, 68, 96, 386/104, 105, 112, 125; 711/114

(56) References Cited

U.S. PATENT DOCUMENTS

| 4,616,263 A | * | 10/1986 | Eichelberger | 386/125 |
| 4,647,986 A | * | 3/1987 | Vaughn et al. | 386/125 |
| 5,261,072 A | * | 11/1993 | Siegel | 710/22 |

\* cited by examiner

Primary Examiner—Huy Nguyen
(74) Attorney, Agent, or Firm—Smith-Hill and Bedell

(57) ABSTRACT

A digital video recorder employing standard hard disk arrays employs a caching system to enable continuous video data to be supplied to and provided from the standard disk drives which may not be adapted for continuous data stream operation. The system is implemented as an array of disk drives and includes cache management functions for governing disk read and write operations. A predictor enables the cache to predict disk reads and disk writes and to maintain the cache based on the predictions. Redundancy enables playback in the event of failure of a drive in the array and also provides improved playback data retrieval time.

11 Claims, 5 Drawing Sheets

DISK-BASED DIGITAL VIDEO RECORDER

This is a continuation of U.S. patent application Ser. No. 08/885,074 filed Jun. 30, 1997, U.S. Pat. No. 6,289,172, which is a continuation of U.S. patent application Ser. No. 07/949,174 filed Sep. 21, 1992 and now abandoned.

This invention relates generally to digital video recorders and, more particularly, to cache management and disk utilization for digital video recorders having multiple inputs and outputs.

BACKGROUND OF THE INVENTION

An array of disk drives may be assembled to provide sufficient bandwidth to record or play digitized video signals, allowing random access to video data (tape recorders allow only sequential access). However, the data transfer rate of standard disk drives is not constant in that the disk read/write heads must often move from one track to the next and during these periods of movement, no transfer of data to or from the disk may take place. Such limitations are easily overlooked in computer applications since the computer may wait during the periods when no access is available. However, such wait periods are not appropriate in video applications given the continuous stream of data associated with a video signal. While the disks cannot support a continuous transfer data rate required for video, disk arrays are typically able to transfer data in bursts (groups of data) at rates slightly higher than the required continuous rate.

Redundant data storage may be provided to insure accurate data reproduction in case of disk drive failure. However, such redundancy can greatly increase the cost of the system when expensive disk drives are employed. Once a determination of drive failure is made, the redundant data may be retrieved, but a redundant system typically will wait a relatively long time period before determining that a drive has failed. Such waits may not be appropriate during playback of continuous data.

Another problem attendant with an array of disks is that data retrieval speed is dictated by the slowest disk in the array.

SUMMARY OF THE INVENTION

Cache management/disk utilization for a digital video recorder according to the present invention employs a cache in conjunction with an array of inexpensive disk drives for recording and playing video signals. The cache is such that data coming in or going out (e.g., digital video) is buffered in the cache through a cache management algorithm, thereby compensating for the periods when the disks may be unable to transfer data. Data is maintained in video and audio blocks, enabling use and modification of either or both of video data and audio data. In playback mode, e.g., the cache management includes retrieving playback data from the disks in advance of their use, and storing this information in the cache, and making data available for output.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
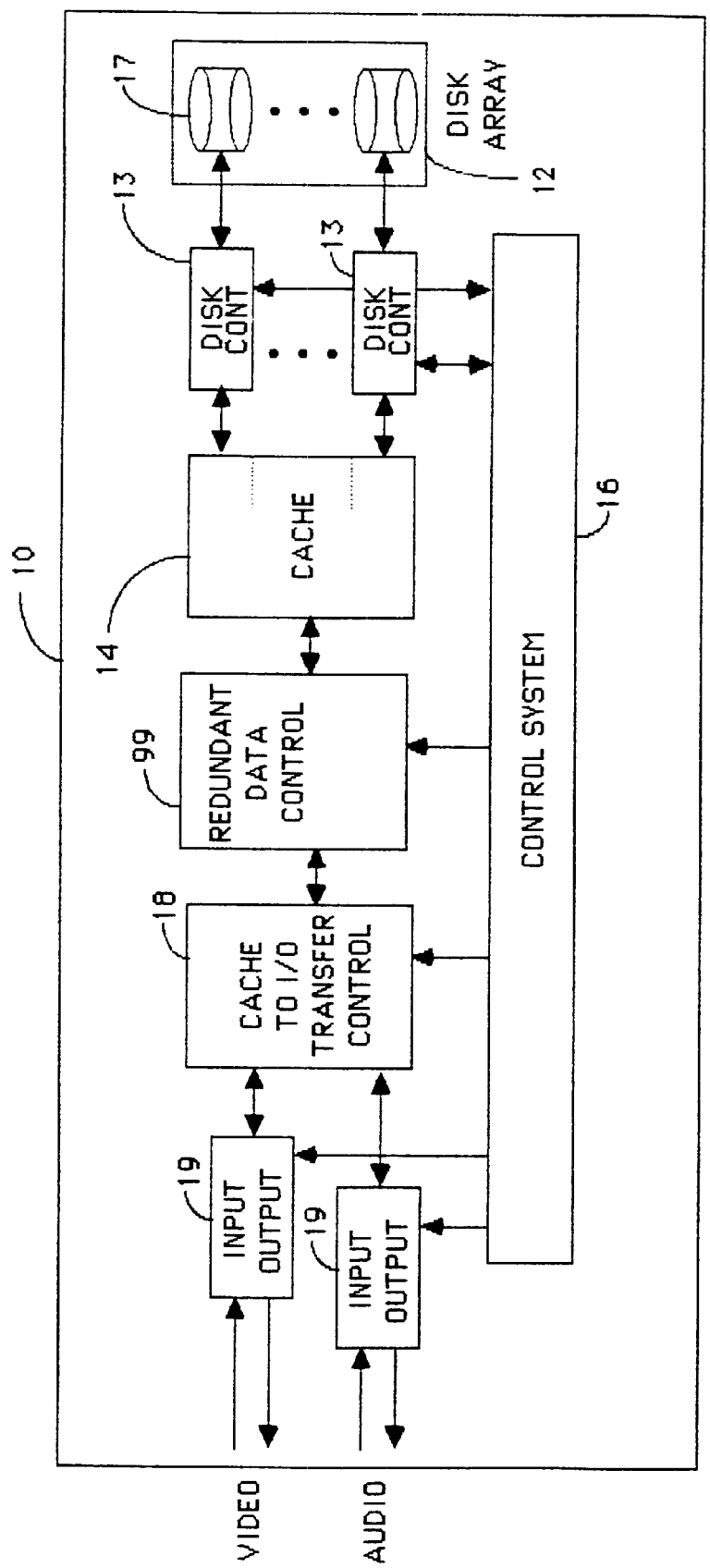
FIG. 1 is a block diagram of a disk-based digital video recorder according to the present invention.

FIG. 1 is a block diagram of a digital video recorder employing cache management/disk utilization according to the present invention. The recorder 10 comprises a number of input/output data channels 19 which are supplied through cache to I/O transfer control 18 to a cache 14. Two I/O data channels, one for video data and one for audio data are shown in FIG. 1. Disk array 12, comprising a plurality of disk drives 17, receives record data and supplies playback data via the cache 14. Operation of the disk array 12 and cache to I/O transfer control 18 is directed by control system 16, which is operative to provide typical video recorder functions, e.g., play, stop, record. The disk drives 17 in the disk array 12 operate asynchronously, and therefore, one drive may complete an operation before another drive completes its corresponding operation.

Data is spread across the plurality of drives 17, providing greater bandwidth than would be available with a single drive. Redundancy is provided through a redundant data controller 99 to handle possible failure of one drive in the array 12, by exclusive ORing corresponding bits sent to each drive, e.g., all bits 0 are exclusive ORed generating redundant bit 0. During write operations, this produces the value stored in a redundant drive 17. The data bit value from a non-responding drive 17 may then be reconstructed during a read by the process described above substituting the redundant drive's data for the missing data. The non-responding drive 17 is the last drive to complete its operation.

Coupled to disk controllers 13, redundant data control 99, transfer control 18 and I/O data channels 19 is the control system 16 which functions to direct management and operation of the recorder, governing where data is stored and the like. The control system 16 implements stop, play, record, etc. commands, managing the cache 14 and generating disk read and write requests as needed. The control system 16 also provides a high level user interface and an interface to other controlling devices. Primary input to the control system 16 is stimulus from an operator of the system.

All disk controllers 13 receive the same instructions from the control system 16. Cache 14 consists of multiple dual-ported memories, one memory for each disk drive 17 in disk array 12, each memory having a DMA controller. From the point of view of each disk controller 13, its portion of memory within the cache 14 is independent of the other controller cache memory portions. However, from the point of view of the redundant data control 99, the cache memories function as a single common memory. The bandwidth between the redundant data control 99 and the cache transfer control 18 is the product of one disk's bandwidth and the number of drives 17 in the array 12 minus one. The disk controllers 13 also include DMA controllers and independently perform direct memory access transfers between the cache 14 and each individual disk drive 17. In typical operation, the disks 17 in the array 12 are given instructions to transfer large blocks of data between the disks and the cache 14. The transfers are accomplished by the DMA controllers transferring smaller blocks. Once a DMA controller has completed an operation, it informs the control system 16, whereupon a new set of instructions is given to the DMA controller. A disk operation complete acknowledgment is generated by a disk array monitor after n−1 drives 17 in the array 12 of n drives have completed their operations and is sent to the Validator (described hereinbelow) for each DMA operation. Internal buffering within each drive 17 buffers data while DMA is reprogrammed, thereby eliminating rotational latency delays. Contiguous data on each disk drive 17 is thereby transferred to and from non-contiguous locations within the cache 14 (see FIG. 2).

Cache to I/O transfer control block 18 is responsible for transfer of data between the cache 14 and input/output data channels 19. Input/output data channels 19 convert incoming video/audio data into an internal format during record operations and convert back to the external video/audio format during playback operations. Any suitable video format may be employed.

In the illustrated embodiment, the array 12 of disk drives 17 has 13 hard disk drives 17, each disk drive being a 1.6 GByte SCSI drive and the cache 14 has 4 MBytes of memory per disk drive (for a total of 52 MBytes).

In the system according to the present invention, the algorithm for managing the cache 14 and the organization of disk data are tightly coupled. The illustrated embodiment of the invention stores both video and audio data on the same disk array 12.

Figure 2:
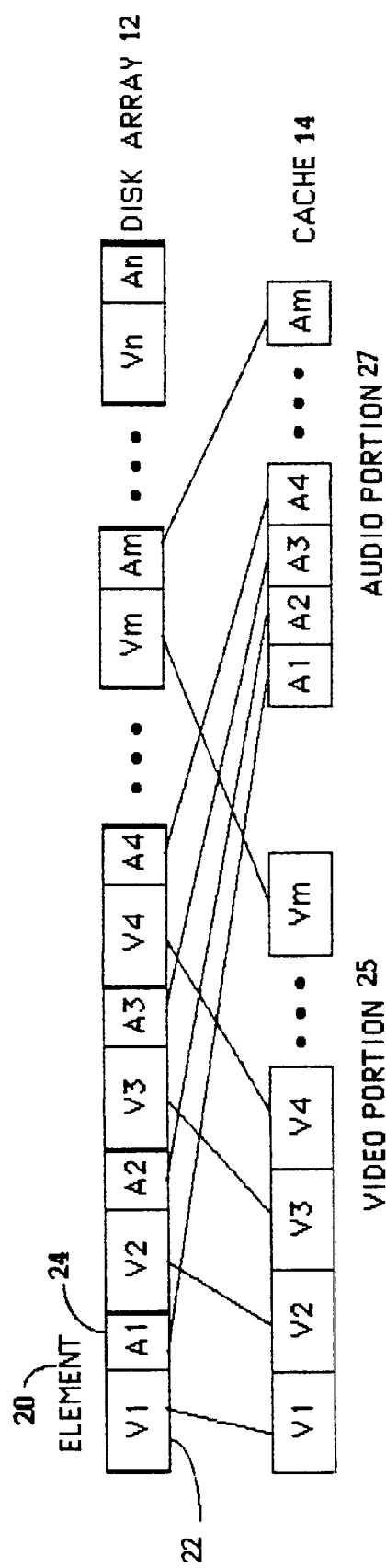
FIG. 2 is an illustration of the organization of data on the disk array and in the cache according to the present invention.

Referring now to FIG. 2, a diagram of the arrangement of data according to the present invention, the data is organized on a disk array 12 as a series of elements 20 one after another, each element comprising a video portion 22 containing active (picture) data for some fixed number of fields and an audio portion 24 containing a corresponding amount of audio data. Inactive (blanking) data is not stored in the disk array 12. Having video and audio separated in chunks is useful in that each may then be manipulated separately. For example, video could be played back while recording the audio, or the video could be played while skipping the audio altogether. The quantity of data in one element 20 is determined by how often the disk array 12 can perform seek operations while still enabling the average bandwidth to be sufficient to support the I/O data rate. The number of fields per element 20 is typically constant, but is dependent on the video format. For example, in the illustrated embodiment of the invention, for D1 525 format signals, an element 20 contains active video and audio data for twelve fields, whereas for D1 625 format signals, an element contains ten fields of active video and audio.

The cache 14 is of lesser length than the disk array 12 and is organized as separate video arid audio portions $V_l$ through $V_m$ and $A_l$ through $A_m$ respectively. Signal data is stored in the cache 14 which is logically divided into a section of video blocks 25 and a section of audio blocks 27 wherein each video block may hold video data for a single disk element 20 and each audio block may hold audio data for a single disk element. Therefore, an element 20 from the disk array 12 corresponds to two blocks in the cache. In some cases a block may contain less than a complete element. The system allows random access to data which is stored contiguously on the disk array 12. A portion of a disk array element 20 may be transferred based on control commands received by the system from the user. In the illustrated embodiment, the cache 14 is of sufficient size to contain eight video blocks and eight audio blocks. The cache 14 is ordered such that the material within the cache is in sequential order. The cache 14 is organized as a circular structure.

As the current position crosses a cache block boundary, the block containing the oldest material is used to fetch future material for playback or reserved for input during record. This organization retains the most current video and audio output in the cache 14 to minimize disk requests during motion state changes.

The control system 16 maintains a cache tag table for tracking information about data within individual cache data blocks. The cache tag includes a tag field state for each video and audio field in the tag which indicates what data within the cache 14 will be used for and with what step of the cache management process the data is currently engaged. The tag field state may be one of the following states:

EMPTY—a field is empty and available for use

PLAY RESERVED—this field is reserved for playback data but is empty

PLAY FILLING—data is being transferred from the disks 17 into this field

PLAY FILLED—all requested data is in the disk cache 14 for this field and is ready for transfer to input/output data channels 19

RECORD FILLING—record data is transferring into this field from input/output data channels 19

RECORD FILLED—data in this field is ready to be written to disk array 12

RECORD EMPTYING—the disk controllers—are in the process of writing data from this field to the disks 17.

Figure 3:
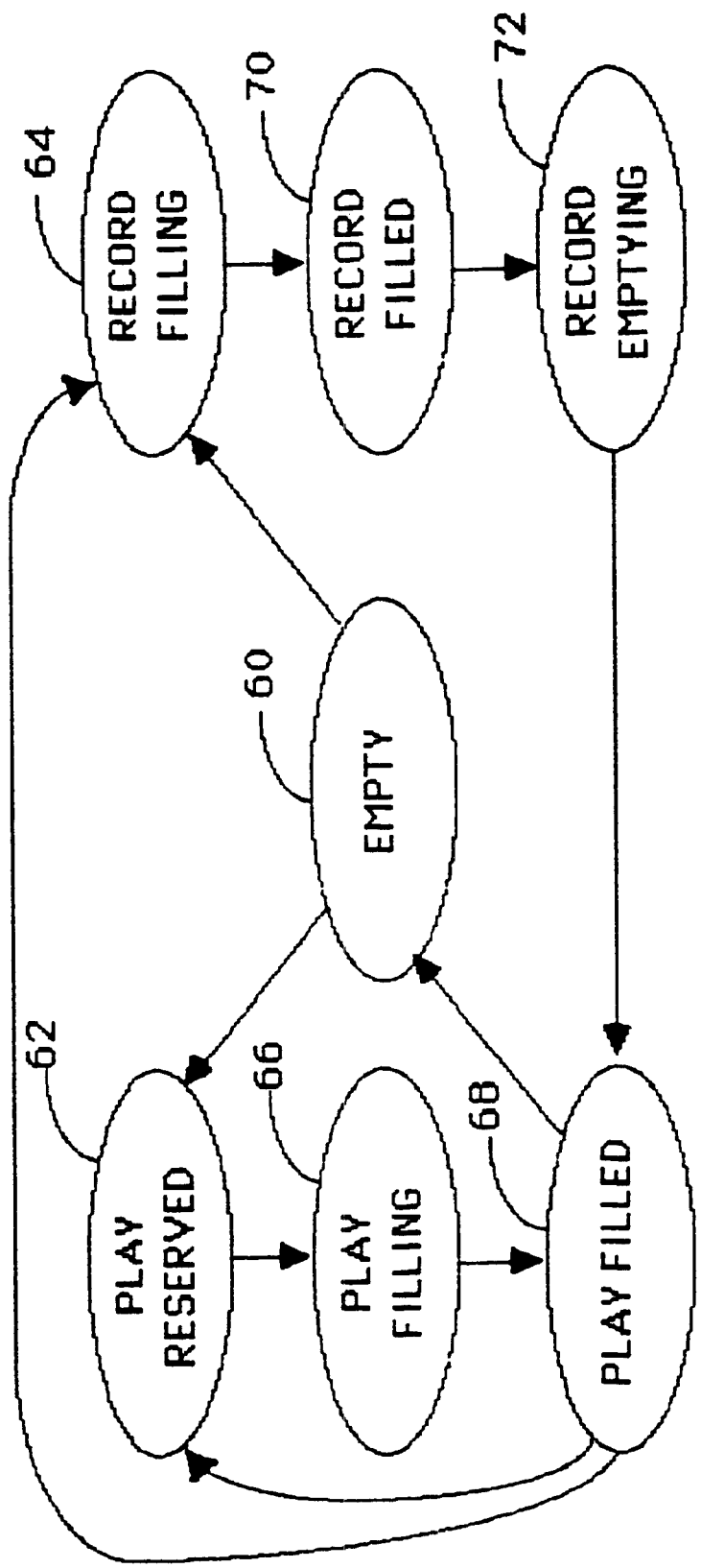
FIG. 3 is a diagram of the various tag states of cache blocks according to the present invention.

The various states available may be better understood in conjunction with FIG. 3 which illustrates the states and the transitions therebetween. From the EMPTY state, a field within the cache block may change either to PLAY RESERVED state 62 or to RECORD FILLING state 64. Once the entry is in the PLAY RESERVED state 62, as data is requested from the disk array, a transition between PLAY RESERVED and PLAY FILLING 66 will occur. The PLAY FILLING state 66 transitions to the PLAY FILLED state 68 once all requested data is in the disk cache 14 for this block and is ready for transfer to I/O data channels 19. From the PLAY FILLED state 68, the tag's field state may then transition to PLAY RESERVED 62, to RECORD FILLING 64 or back to the EMPTY state 60 as the block is needed for future playback or record operations.

The RECORD FILLED state 70 is reached from RECORD FILLING state 64 when all requested data is in the disk cache 14 and ready to be written to disk. From the RECORD FILLED state 70, transition may be made to the RECORD EMPTYING state 72 when the disk controllers 13 are in the process of writing data to the disks 17. Once the data is written to the disk array 12, the state is changed to PLAY FILLED 68, allowing playback or freeing the cache block for further use.

The cache tag also includes the playback starting and ending fields, the field corresponding to the first field of the disk element 20 mapped to the tag, the cache address of each field of the tag, the disk array 12 containing the data, and the late disk, identifying which was the last disk 17 to respond.

It is the responsibility of the control system 16 (FIG. 1) to retrieve data from the disk array 12 before the data is needed for playback or to provide temporary storage of data during a record operation until such time as the data can be written to the disk array. In each case, the control system 16 must predict what will be needed in the future, this prediction being a function of the current position within the data, the system motion state and the play speed. Current position is the field which is either currently being provided as input or which is being output. The general goal of cache management is to have enough material in the cache 14 surrounding the current position to satisfy any action that the operator may make in changing the motion state of the system.

The control system 16 is responsible for executing high-level commands, providing disk read and write commands to the disk array 12 and monitoring each drive 17 in the array to determine completion of the data transfer.

In playback mode, the disk array 12 must read information in advance of when it will actually be output and store the information in the disk cache 14. The information in the disk cache 14 may then be transferred to video and audio outputs in real time. In record mode, incoming video and audio data are transferred to the disk cache 14 in real time, and the disk array 12 is instructed to write the cached information an element at a time.

Cache management is divided into three subsystems that deal with operation of the disk cache 14 and the disk array 12: Predictor; Validator; and Query. Predictor determines what material should be in the cache 14 based on the current position within the data and the current motion state. The motion state may be one of Stopped, Playing, Recording, or Shuttling, which are described hereinbelow with reference to Table I. Predictor also translates between playlist space and reel space. Reel space is a sequential series of fields stored on a disk array 12. A reel may span more than one disk array 12 or several reels may share a disk array 12. The system contains random-access playback capabilities which are provided to the user through the use of playlists. The system can access material scattered randomly across the disk array 12 in addition to the standard linear manner of playback. Playlist space comprises several segments, a segment being a set of one or more contiguous output fields. Each playlist may identify different portions of a reel. A field that is defined in terms of playlist space is designated as an offset of a number of fields relative from the first field in the playlist. Predictor will generate requests for material, e.g., video data or audio data, based on the current motion state, the contiguous desired material that is currently within the cache 14 and space available in the cache. Transfers may include playback (transfers from the disk array 12 to the cache 14) and record (transfers from the cache into the disk array). Predictor is performed once each field.

Validator updates the state of the cache 14 according to the acknowledgments received from the disk array 12. These acknowledgments indicate what data has been transferred to and from the disk array 12, validator is also responsible for indicating that sufficient material has been transferred into or out of the cache 14 to allow further commands to be processed.

Query facilitates transfer of data between the cache 14 and input/output data channels 19. It does this by providing cache addresses for location of video and audio materials that are needed for playback or providing the addresses necessary to indicate where newly recorded material will be placed within the cache 14 prior to transfer to the disk array 12.

The function of the Predictor is presented as a state table in Table I. The state table consists of the previous state along the horizontal axis and a new state along the vertical axis. Each box of Table I represents the procedure followed at the state transition. At any one time, the previous state or new state may comprise one of the following states: Initialize; Stopped; Playing; Recording; or Shuttling. Initialize is the state which occurs when the recorder 10 is first started. The Stopped state takes on two modes: steady state and go to request. In the steady state mode, Stopped is the state wherein the current position is not changing. In the case of a go to, Stopped state processes a request from the user to output a field other than the current position. The system processes this go to request by assessing the playlist field requested relative to the current contents of the cache 14 and only the data needed to center the request field within the cache is requested from the disk array. In the Playing state, the recorder retrieves data from the disk arrays 12 and supplies the retrieved data as output through input/output data channels 19. The Recording state involves transferring received data from input/output data channels 19 to the disk arrays 12. Shuttling is a state wherein the recorder 10 plays data.

TABLE 1

Predictor State Transition Table

| | Previous State | | | | |
|---|---|---|---|---|---|
| | Initialize | Stopped | Playing | Recording | Shuttling |
| Initialize | Invalid transition | Invalid transition | Invalid transition | Invalid transition | Invalid transition |
| Stopped | Set cache busy Build Cache | Crossed Elem Time to Fetch Build Cache | Time to Fetch Build Cache | Set cache busy Write Residue Build Cache | Set cache busy Build Cache |
| Playing | Invalid transition | Play | Play | Set cache busy Write Residue Calculate Gap Play | Set cache busy Calculate Gap Play |
| Recording | Invalid transition | Record | Record | Set Tracks Record | Record |
| Shuttling | Invalid transition | Shuttle | Shuttle | Invalid transition | Shuttle |

With reference now to Table I, the various operations of the Predictor will be described. A number of processes are set out in Table I and are defined as follows:

Set cache busy—sets the state of the cache status to indicate to the system that the cache management process is not available for command input.

Build Cache—performs an analysis of the cache 14 to determine the usable contiguous material within the cache, the amount of cache space that is available, the size and distribution within disk elements 20 of desired segment and playlist fields. Build Cache also determines where new material will be placed within the cache, prioritizes and generates disk requests.

Crossed Elem(ent)—determines if the current position within the play or record data has crossed a cache element boundary. If a boundary has not been crossed, no further steps are taken.

Time to Fetch—determines if the amount of time that would be necessary to fetch the necessary material exceeds the limits of the system and if so, sets the state of the cache 14 to busy.

Play—maintains a centered cache as the current position moves through the cache 14. The cache is centered when the current position has equal amounts of forward and reverse play data in the cache on either side of the current position. Play optimizes and generates disk read requests to transfer data from the disk array 12 that may be needed to fill the cache.

Record—maintains a centered cache as input source data is recorded into the cache 14. Optimizes and generates disk requests to write recorded material from the cache to the disk array 12.

Shuttle—determines the expected field based on shuttle speed and change of direction. Generates disk read requests to fill the cache 14 with data from the disk array 12.

Write Residue—determines if the system has completed the recording of source material into the cache 14. If the recording is complete, a disk write request is issued to transfer material from the cache to the disk array 12.

Calculate Gap—determines the portion of the cache 14 which will not be usable because of transfer time constraints and other system constraints.

Set Tracks—determines whether, for example, video tracks, audio tracks or both are being recorded.

Invalid transition denotes that the state is not properly attainable during normal operation of the recorder.

The rules which the Predictor applies in operation are:

In forward play, the Predictor reserves cache blocks as far forward in time as needed to center the current output field in the cache 14. Future material will occupy up to five cache blocks ahead of the block containing the current output; likewise, previously played material will occupy about three blocks prior to the block containing the current output. Blocks previously played are maintained until needed for future playback material. This assures that material needed in the cache 14 for state transitions (i.e., Play to Stopped) is available without necessity of a disk request. For reverse play, this same algorithm is followed; however, a backward biased cache is built, again maintaining a centered output with approximately five blocks proceeding the block containing the current output.

The system is in the Record state when any or all tracks are recording. The procedure followed during Record is one of allocation of cache blocks for use by the input data. As a single block is filled by the input data, the cache manager issues disk requests for the disk array 12 to transfer data from the cache to the disk array 12. The cache manager then frees the next block as available for input. In order to minimize disk requests during state transitions, the material which has been previously recorded and transferred to disk array 12 is maintained in the cache 14. This assures that if a transition from Record to Play is made before the recorded material has filled the entire cache, the material contained in the cache 14 prior to the record is still available. Likewise, during a transition from Record to Play or Stopped, the material which was just recorded remains in the cache 14 requiring that only the material ahead of the recorded data needs to be fetched from the disk array 12.

In the Shuttle state, single fields are placed into the cache blocks. The field which will be requested from the disk array 12 is determined by the current output position plus a shuttle constant times the shuttle speed, e.g., with a current output field of 100 and a speed of 4 (unity is 1) and a constant of 3, the next field to be placed in the cache block adjacent to the block containing the current output is field 112. Again, the previously output data is retained in the cache 14 to allow for change in shuttle direction, e.g., reverse to forward.

In the Stopped state, the cache is built around the current output position. The current output position is the output field requested by the user. Depending on the previous state of the cache 14 (particularly the current output position) more or fewer disk reads will have to be generated to center the current output position. If the current output position is not contained within the cache 14, the entire cache must be rebuilt from the disk array 12. This current output position must be fetched from the disk array 12 immediately. Therefore, the material requested from the disk array 12 follows the pattern: request current output position, request data needed ahead of the current output position, request data needed behind the current output position. If the current output position is contained in the cache 14, the disk requests needed to center this position are generated. An assessment of the cache 14 is made to assure that the minimum number of fields are requested from the disk array 12.

Figure 4:
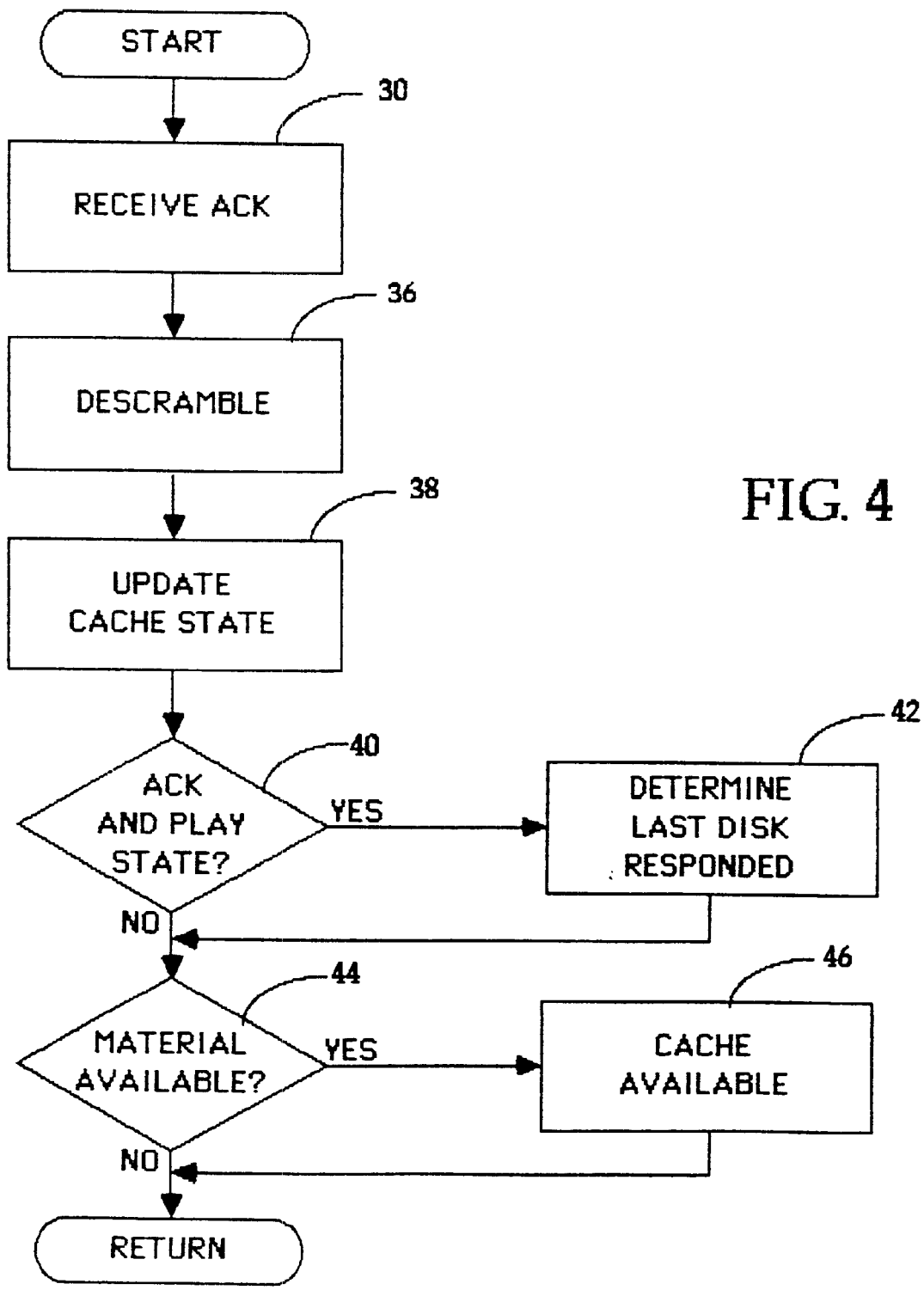
FIG. 4 is a flow chart of the Validator process employed by the cache management system.

The Validator process is responsible for maintaining the cache state in response to acknowledgment of data transfers to and from the disk arrays. Referring now to FIG. 4, a flow chart of the Validator process steps performed in cache management, the Validator process begins with Receive acknowledgements (step 30), wherein acknowledgement signals are received from the disk array 12 indicating whether an amount of material has been transferred to the cache 14 from the disk array when in play mode or information has been transferred from the cache to the disk array when in record mode. Descramble (step 36) determines what type of material was received from the dusk array 12, video or audio or both, and translates the received information into cache fields. Next, the cache tag field states are updated (step 38) which sets the state of the cache 14 to indicate which blocks of video and audio are now available for playback or record. The various states which may be assumed by cache blocks are described hereinabove with reference to FIG. 3. Following step 38, decision block 40 determines whether an acknowledge was received at step 30 and whether the system is currently in a play state. If the decision is YES, then step 42, determine last disk responded, is performed. The determine last disk responded step 42 updates the state of the cache 14 to indicate which disk 17 within the array was the last to respond relative to the most recently received acknowledgment. After step 42, the Validator process continues directly following decision block 40. If the result of decision block 40 is NO, then step 42 is not performed. Next, decision block 44 determines whether material is available. Material available indicates whether material has been transferred into or out of the cache 14 sufficient to allow further cache data transfer commands to be processed. If material is available, then step 46 updates the system cache state to an available status, which indicates that further cache commands may be processed. After step 46 or following decision block 44 if a NO results from the decision, the Validator process is completed.

Figure 5:
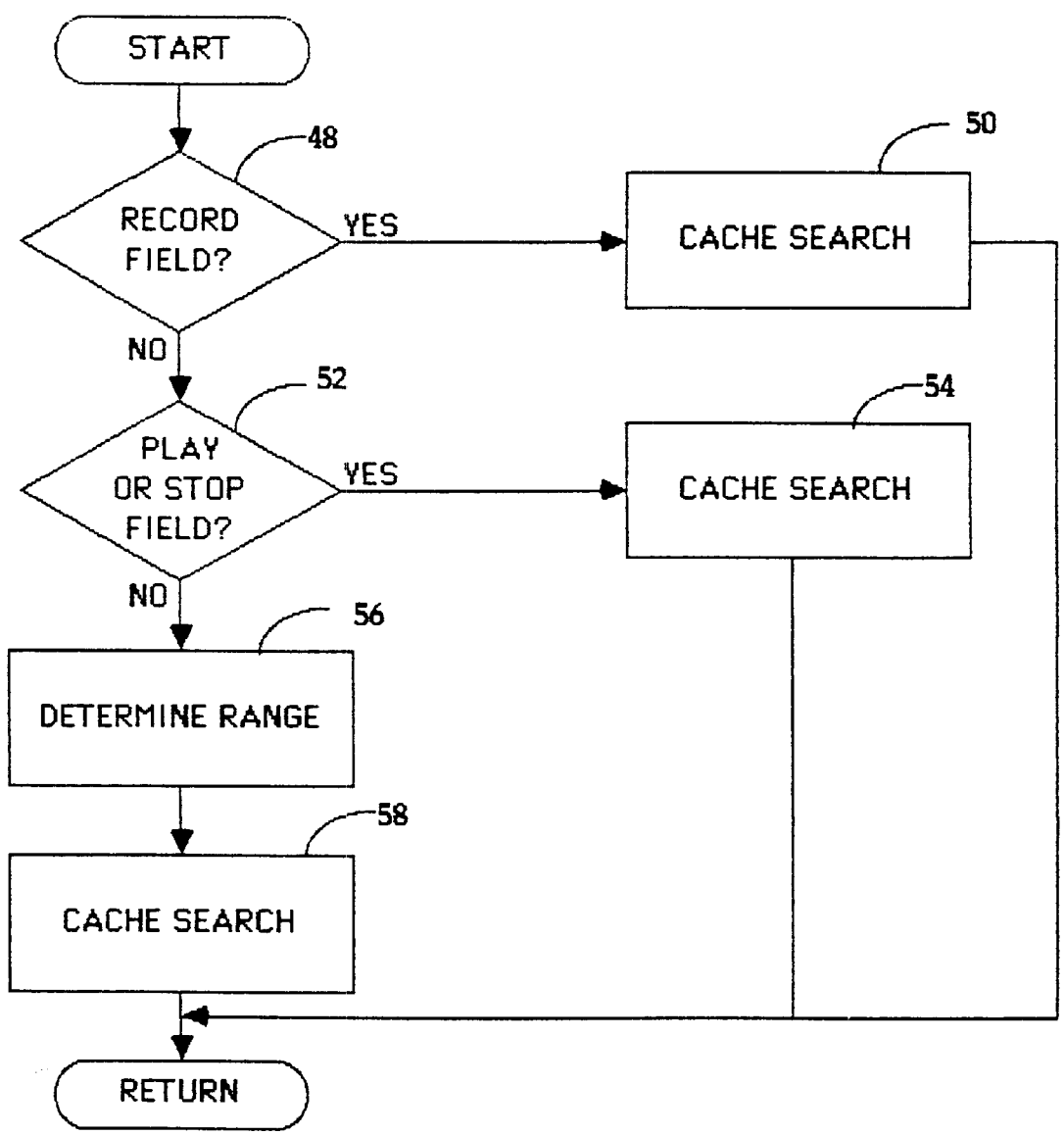
FIG. 5 is a flow chart of the Query process employed by the cache management system.

FIG. 5 is a flow chart of the Query process. Query is called by the control system 16 to either determine where to place newly received recorded material in the cache 14, or to determine the location within the cache of material needed for playback. Query begins with decision block 48, which determines whether a record state field is being requested. If a record field is requested, then a search of the cache 14 is made (block 50) in reel space to determine where the record data will be placed in the cache. Following step 50, the Query process is complete. However, if the result of decision block 48 is NO, then decision block 52 is performed to determine whether the cache request is for either the Playing or Stopped states. If the result is YES, then a search is made in the cache (block 54) for appropriate material within the cache. Again, Query is complete after block 54.

If the result of decision block 52 is NO, then that system is in Shuttling state and step 56 determines a range of cache locations that would be acceptable to provide appropriate shuttle playback data. Following step 56, the cache 14 is searched in step 58 to determine the position within the cache of data that meets the range criteria determined in step 56. The Query operation is then completed.

As mentioned hereinabove, the system provides redundancy in the disk array 12 which enables playback to occur even though one drive 17 may not have responded. Such an operation would not be appropriate in record mode since the redundant data must be transferred reliably to be of any use in playback and, hence, the whole set of disks must respond before a record operation is completed. Employing such redundancy enables the system to provide playback data without waiting for the slowest disk 17 of an array to respond with data or without waiting to determine that a disk drive has failed. Therefore, the response of the system is not dictated by the slowest drive, providing a speed improvement on playback. Further, it is not necessary to determine that a drive 17 has actually failed before employing redundancy to reconstruct playback data; the reconstruction is automatically performed after n–1 drives respond with data. Since the identity of the non-responding (or last to respond) drive 17 is known, reconstruction of data is accomplished by exclusive ORing the data from the n–1 drives thereby producing the missing data. The resultant data is then inserted at the position where the data from the non-responding or late drive 17 would have been. Of course, if the non-responding drive is the one that contains the redundant data bit, no reconstruction is necessary. Thus, the recorder provides redundant storage of video and audio data.

Therefore, a system and method for managing a disk cache 14 for a digital video recorder 10 have been shown and described wherein a disk array 12 is managed to enable continuous data to be written to or supplied from a series of non-continuous access disks 17 wherein the disks 17 are more likely to be operating in a burst mode rather than in a continuous data stream mode wherein the burst rate of the disk array (the rate at which individual groups of data are transferred to the array) is higher than the continuous data stream rate. The term "continuous data" may be understood to include data transferred external to or received external from the recorder 10 at a uniform clock rate, while non-continuous access storage may include the transfer of data at non-uniform clock rates, sometimes at a higher rate than the "continuous" uniform rate, but other times at a much lower (e.g. zero) rate.

While the particular embodiment employs video and audio data, other information may also be used, for example, video and key data or video and key/depth data, wherein depth data may define layering priority of corresponding video data. The video portion of an element may also contain both a video signal and corresponding key data. Further, multiple disk reorders may be coupled together to provide multiple disk arrays to allow more record and playback storage time or to allow more channels of data to be recorded concurrently under control of one control system 16. Therefore, it will be appreciated that the invention is not restricted to the particular embodiment that has been described, and that variations may be made therein without departing from the scope of the invention as defined in the appended claims and equivalents thereof.

What is claimed is:

1. Apparatus for recording and playing a television data stream having video data and audio data comprising:
   an array of non-continuous access, asynchronous disk drives for storing the video and audio data from the television data stream;
   a cache having a circular structure and a capacity less than the array of asynchronous disk drives, but sufficient to minimize disk drive data requests during motion state changes, for either receiving the television data stream from an external device and storing said received television data stream temporarily until said television data stream can be transferred in discrete portions as video and audio data to said array of asynchronous disk drives while still storing the received television data stream, or retrieving discrete portions of video and audio data from said array of asynchronous disk drives and storing said retrieved video and audio data until said retrieved video and audio data is transferred as the television data stream to an external device while still storing the retrieved video and audio data; and
   computer means for directing operation of said cache to provide interchange of video and audio data as the television data stream between said array of asynchronous disk drives and an external device.

2. Apparatus according to claim 1, wherein said cache comprises memory for holding said television data stream from an external device and for holding retrieved data from said array of non-continuous access, asynchronous disk drives.

3. Apparatus according to claim 1, for recording and playing video data, wherein said cache comprises a plurality of video data storage blocks, each equal in length to a predetermined multiple of frames of video data for storing video data from or for the television data stream.

4. Apparatus according to claim 1, for recording and playing video data and associated audio data, wherein said cache comprises a plurality of multiple frame video data storage blocks for storing video data and a plurality of corresponding audio data storage blocks for storing audio data from or for the television data stream.

5. Apparatus according to claim 1, wherein said computer means further comprises program means for managing organized exchange of data between an external device and said cache and between said cache and said array of non-continuous access, asynchronous disk drives.

6. Apparatus according to claim 1 further comprising a redundant disk drive for recording redundant data and enabling playback of valid data even when less than the entire array of non-continuous access, asynchronous disk drives has provided playback data.

7. A video disk recorder comprising:
   an array of n non-continuous access, asynchronous disk drives for storing video and audio data from a television data stream, one of said asynchronous disk drives storing redundant data;
   a memory cache having a circular structure and a lesser capacity than the disk drives, but sufficient to minimize disk drive data requests during motion state changes, for either receiving the television data stream from an external device and storing the received television data stream temporarily as video and audio data until the television data stream can be transferred in discrete portions to the array of asynchronous disk drives while still storing the received television data stream, or retrieving discrete portions of video and audio data from the array of asynchronous disk drives and storing the retrieved video and audio data until the retrieved video and audio data is transferred as the television stream to an external device while still storing the retrieved video and audio data; and
   computer means for directing operation of said memory cache to provide interchange of video and audio data as the television data stream between the array of asynchronous disk drives and an external device.

8. Apparatus according to claim 7 wherein said computer means comprises means for retrieving video and audio data from the array of asynchronous disk drives after n−1 of the disk drives have responded to a request for data retrieval.

9. A digital video recorder according to claim 7, wherein said memory cache is organized as a plurality of blocks, each equal in length to a predetermined multiple of frames of video data and a plurality of said memory cache blocks store video data.

10. A digital video recorder according to claim 7, for recording and playing both video data and audio data, wherein said memory cache is organized as a plurality of blocks, each equal in length to a predetermined multiple of frames of video data, and a first plurality of said memory cache blocks are adapted to store video data and a second corresponding plurality of said memory cache blocks are adapted to store audio data.

11. A method for recording and playing a television data stream having video and audio data comprising the steps of:

receiving the television data stream from an external device;

storing continuously the received television data stream as the video and audio data in a cache having a circular structure and a capacity sufficient to minimize data transfer requests during motion state changes;

transferring the video and audio data from the cache in discrete portions to an array of non-continuous access, asynchronous disk drives having a greater capacity than the cache while storing the received television data stream thereby recording the video and audio data;

receiving the video and audio data in discrete portions from the array of non-continuous access, asynchronous disk drives;

storing the received video and audio data in said cache; and transferring continuously the video and audio data from the cache to the external device as the television data stream while storing the video and audio data thereby playing the data.

* * * * *